Figures 1, 2, 3:
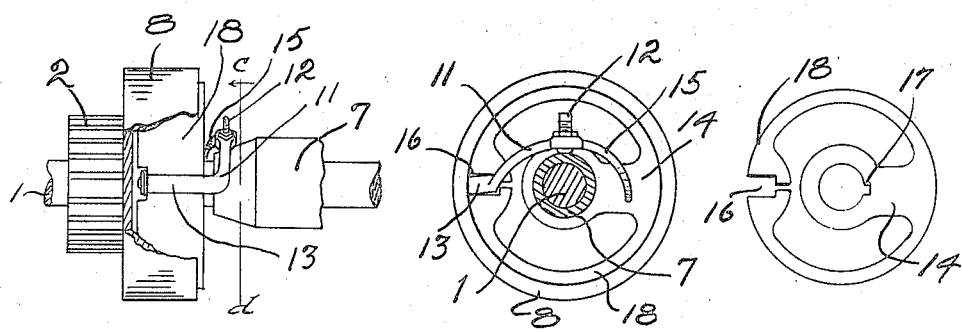

J. R. VOORHEES.
FRICTION CLUTCH.
APPLICATION FILED NOV. 19, 1912.

1,091,783.

Patented Mar. 31, 1914.

WITNESSES:

INVENTOR
John R. Voorhees
by G. C. Kennedy,
ATTORNEY

UNITED STATES PATENT OFFICE.

JOHN R. VOORHEES, OF CEDAR FALLS, IOWA.

FRICTION-CLUTCH.

1,091,783.

Specification of Letters Patent.  Patented Mar. 31, 1914.

Application filed November 19, 1912. Serial No. 732,276.

*To all whom it may concern:*

Be it known that I, JOHN R. VOORHEES, a citizen of the United States of America, and a resident of Cedar Falls, Blackhawk county, Iowa, have invented certain new and useful Improvements in Friction-Clutches, of which the following is a specification.

My invention relates to improvements in friction clutches, and the object of my improvement is to provide for winding drums, hoisting machinery and the like, a simple yet effective clutch adapted for manual operation and release.

This object I have accomplished by the mechanism which is hereinafter described and claimed, and which is illustrated in the accompanying drawings, in which:

Figure 1 is an enlarged detail elevation of my friction clutch, with parts broken away. Fig. 2 is a transverse vertical section of Fig. 1, taken on the line c—d thereof, and showing the inwardly-directed face of the clutch in elevation. Fig. 3 is a detail elevation of the elastic yieldable inner clutch-member.

Similar numerals of reference denote corresponding parts throughout the several views.

My friction clutch may be incorporated in any species of mechanism where its use may be necessary or prove desirable, but for convenience of illustration I have shown it associated with the winding-drum of a hoisting machine.

A driven-shaft 1 has a fixedly connected gear-wheel 2 and friction-drum 8 mounted loosely on one end. A sleeve 7 is loosely slidably mounted upon the shaft 1 and has a coned end. A hub is splined on said shaft 1 and has an integral radial arm 14 provided with oppositely-directed elastic ring-parts 18, which latter movably fit the inner wall of the rim 8. The ends of said ring-parts are widened, with the adjacent extremities recessed to provide like opposed rectangular seats for a block 13, the latter having its inner end held to prevent removal from its seat by an enlargement of a washer secured thereon. The block has an outwardly-projecting finger 11 which is arched over the shaft 1, spaced therefrom, and provided with a set-screw 12 working through it inwardly. The outer part of the finger is spaced from the arm 14 and has its extremity recurved to bear movably thereagainst. A cone 7 is slidable on the shaft 1 to pass under the end of the screw 12 to swing or rock the finger and block so that the latter will spread the widened ends of the ring 18 apart to frictionally engage said rim 8, which causes rotation of the shaft 1. The spacing of the finger permits the cone clearance to work slidingly under the set-screw 12, while the bearing of the tip of said finger against the arm 14 prevents a torsion at its junction with said block, with consequent fracture.

Having described my invention, what I claim as new, and desire to secure by Letters Patent, is:

In a friction-clutch, a driven-shaft, a friction-rim loosely mounted thereon, a hub fixed on said shaft and having an arm provided with an integral split friction ring whose parts are elastic and widened at their extremities with the meeting edges of each extremity cut away to provide like opposed rectangular bearing-seats, a rectangular block seated in said rectangular seat and secured therein, said block fitting said seat, said block having an integral outwardly directed finger spaced from said ring and arched over said shaft with its further extremity recurved to movably bear against the arm which carries said ring, and a cone slidable on said shaft under said finger, said finger having an adjustable set-screw mounted thereon and having its extremity or tip adapted to contact slidingly with said cone when the latter is moved thereunder to push out the finger, rock the latter and said block to spread said ring-parts to a frictional engagement with said friction-rim.

Signed at Waterloo, Iowa, this 31st day of Oct. 1912.

JOHN R. VOORHEES.

Witnesses:
GEO. C. KENNEDY,
W. H. BRUNN.